United States Patent [19]

Johnston, Jr. et al.

[11] 4,169,797

[45] Oct. 2, 1979

[54] COMPOSITION FOR ACIDIZING SUBTERRANEAN FORMATIONS

[75] Inventors: Chester C. Johnston, Jr.; Brent J. Bertus; James E. Hessert, all of Bartlesville, Okla.

[73] Assignee: Phillips Petroleum Company, Bartlesville, Okla.

[21] Appl. No.: 846,060

[22] Filed: Oct. 27, 1977

Related U.S. Application Data

[62] Division of Ser. No. 643,985, Dec. 24, 1975, Pat. No. 4,068,720.

[51] Int. Cl.$^2$ .............................................. E21B 43/27
[52] U.S. Cl. ............................... 252/8.55 C; 166/307; 252/8.55 R
[58] Field of Search ...................... 252/8.55 R, 8.55 C, 252/316; 166/282, 283, 307, 308

[56] References Cited

U.S. PATENT DOCUMENTS

| | | | |
|---|---|---|---|
| 2,778,427 | 1/1957 | Cardwell et al. | 252/8.55 C |
| 3,727,688 | 4/1973 | Clampitt | 166/283 |
| 3,845,822 | 11/1974 | Clampitt et al. | 166/281 |
| 4,021,355 | 5/1977 | Holtmyer et al. | 252/8.55 |

*Primary Examiner*—Herbert B. Guynn

[57] ABSTRACT

Gelled acidic compositions suitable for either matrix-acidizing or fracture-acidizing of subterranean formations, and methods of using said compositions in acidizing operation, are provided. Said compositions comprise water, a water-soluble cellulose ether, an acid, a water-soluble compound of a polyvalent metal wherein the metal can be reduced to a lower polyvalent valence state and cause gelation of the water containing said cellulose ether and said acid, and a reducing agent capable of reducing said metal and causing said gelation.

9 Claims, No Drawings

COMPOSITION FOR ACIDIZING SUBTERRANEAN FORMATIONS

This is a divisional application of application Ser. No. 643,985 filed Dec. 24, 1975, now U.S. Pat. No. 4,068,720 issued Jan. 17, 1978.

This invention relates to acid treating or acidizing of subterranean formations.

Acid treating or acidizing of porous subterranean formations penetrated by a well bore has been widely employed for increasing the production of fluids, e.g., crude oil, natural gas, etc., from said formations. The usual technique of acidizing a formation comprises introducing a non-oxidizing acid into the well under sufficient pressure to force the acid out into the formation where it reacts with the acid-soluble components of the formation. The technique is not limited to formations of high acid solubility such as limestone, dolomite, etc. The technique is also applicable to other types of formations such as a sandstone containing streaks or striations of acid-soluble components such as the various carbonates.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix-acidizing.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

Thus, it is within the scope of the present invention to inject the gelled acidic compositions of the invention into the formation under insufficient pressure to cause fracturing of the formation and carry out a matrix acidizing operation, or inject said gelled acidic composition at sufficient rates and pressure to cause fracturing and carry out a combination fracture-acidizing operation.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent and surrounding the well bore. The severity of the problem increases as the well temperature increases because acid reactivity with the formation increases with increasing temperatures, as in deeper wells.

Poor penetration can also be caused, and/or aggravated, by fluid loss to the more porous zones of the formation where low permeability is not a problem. Poor penetration can also be caused, and/or aggravated, by leak-off at the fracture faces in combination fracturing-acidizing operations. Either said fluid loss or said leak-off can frequently worsen the situation by leaving the tight (low permeability) zones of the formation unchanged and merely opening up the already high permeability zones.

One solution which has been proposed for the above discussed problem is to incorporate various polymeric thickening or viscosifying agents into the acid solution. Said agents serve to thicken the acid solution and thus increase the viscosity thereof. It has been reported that so thickened acid solutions have reduced fluid loss properties. For example, see U.S. Pat. No. 3,415,319 issued in the name of B. L. Gibson; and U.S. Pat. No. 3,434,971 issued in the name of B. L. Atkins. It has also been reported that the reaction rate of said so-thickened acid solutions with the acid-soluble portions of the formation is lessened or retarded. See, for example, U.S. Pat. No. 3,749,169 issued in the name of J. F. Tate; U.S. Pat. No. 3,236,305 issued in the name of C. F. Parks; and U.S. Pat. No. 3,252,904 issued in the name of N. F. Carpenter.

Higher viscosities are also advantageous in combination fracturing-acidizing operations in that the more viscous acidic solutions produce wider and longer fractures. More viscous acid solutions are also more effective in carrying propping agents into the formation when propping agents are used.

Another problem encountered in acidizing operations, particularly when employing acidizing compositions having thickening or viscosifying agents incorporated therein, is stability to heat. By stability to heat, it is meant the retention of the increased or greater viscosity properties under the conditions of use. Such compositions to be satisfactory should be sufficiently stable to resist degeneration by the heat of the formation for a period of time sufficient to accomplish the intended purpose, e.g., good penetration and significant etching of the formation. The degree of stability required in any particular operation will vary with such operating variables as the type of formation being treated, the temperature of the formation, the well depth (time to pump the acidic composition down the well and into the formation), the acid concentration in the composition, etc. For example, acidizing of a tight low permeability formation will proceed more slowly than a more permeable formation, other factors being the same, because a longer time will be required to obtain a significant amount of etching and the composition must remain in place and effective for a longer period of time. Also, more time will be required to pump the acidic composition into place in the formation.

The temperature of the formation usually has a pronounced effect on the stability of the acidizing compositions and, generally speaking, is one of the most important operating variables when considering stability. Increased formation temperatures usually have at least two undesirable effects. One such effect is degeneration of the composition, e.g., decrease in viscosity. Another such effect is increased rate of reaction of the acid with the formation. Thus, some compositions which would be satisfactory in a low temperature formation such as in the Hugoton field in the Anadarko basin might not be satisfactory in formations encountered in deeper wells as in some West Texas fields.

In ordinary acidizing operations using unthickened acids there is usually no problem in removing the spent acid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation, or in the fracture. This can inhibit the production of fluids from the formation and can require costly cleanup operations. It would be desirable to have gelled acidic compositions which break down to a lesser viscosity within a short time after the operation is completed.

The present invention provides a solution for, or at least mitigates, the above discussed problems. The present invention provides improved methods for acidizing, or fracture-acidizing, subterranean formations; and new gelled acidic compositions for use in said methods.

Thus, in accordance with one broad aspect of the concept of the invention, there is provided a method for acid treating a porous subterranean formation susceptible of attack by an acid and penetrated by a well bore, which method comprises: injecting into said formation via said well bore a gelled acidic composition comprising water; an amount of a water-soluble cellulose ether which is sufficient to thicken said water; an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state; an amount of a water-soluble reducing agent which is effective to reduce at least a portion of said metal to said lower valence state and cause said gelation; an amount of a non-oxidizing acid which is capable of reacting with a significant amount of the acid-soluble components of said formation; said cellulose ether, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation; and maintaining said composition in said formation in contact therewith for a period of time sufficient for the acid in said composition to significantly react with the acid-soluble components of said formation and stimulate the production of fluids therefrom.

Further, in accordance with another broad aspect of the concept of the invention there is provided a gelled acidic composition, suitable for matrix acidizing or fracture-acidizing of a subterranean formation, comprising: water; a water-thickening amount of a water-soluble cellulose ether; an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state; an amount of a water-soluble reducing agent which is effective to reduce at least a portion of said metal to said lower valence state and cause said gelation; and an amount of a non-oxidizing acid which is capable of reacting with a significant amount of the acid-soluble components of said formation; said cellulose ether, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to significantly react with the acid-soluble components of said formation and stimulate the production of fluids therefrom.

Still further, in accordance with other broad aspects of the invention, there are provided methods for preparing said gelled acidic compositions.

As noted above, the gelled acidic compositions of the invention must be suitable for matrix acidizing or fracture-acidizing of subterranean formations. In order to satisfy this requirement, the cellulose ether, the polyvalent metal compound, the reducing agent, and the acid, in the amounts used, must be sufficiently compatible with each other, in an aqueous dispersion thereof, to permit the gelation of said dispersion and thus form a said composition having sufficient stability to degeneration by the heat of the formation to permit good penetration of said composition into the formation. Furthermore, once said penetration has been attained, the said stability must be sufficient to permit the maintaining of said composition in contact with the formation for a period of time sufficient for the acid in the composition to significantly react with the acid-soluble components of the formation and stimulate the production of fluids therefrom, e.g., by creating new passageways or enlarging existing passageways through said formation.

Herein and in the claims, unless otherwise specified, the term "good penetration" means penetration of live or effective acid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given acidizing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of a few feet, e.g., up to 5 or more, in a small volume matrix acidizing operation, and several hundred feet, e.g., up to 500 or more, in a large volume fracture-acidizing operation.

Herein and in the claims, unless otherwise specified, the term "aqueous dispersion" is employed generically to include both true solutions and stable colloidal suspensions of the components of the compositions of the invention which can be gelled as described herein.

In general, any of the water-soluble cellulose ethers meeting the above stated compatibility requirements can be used in the practice of the invention. Thus, under proper conditions of use, said cellulose ethers which can be used can include: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC for carboxymethyl cellulose, CMHEC for carboxymethyl hydroxyethyl cellulose, etc. For example, water-soluble CMC is commercially available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in preparing the gelled acidic compositions of the invention can vary widely depending upon the viscosity grade and purity of the ether, and properties desired in said compositions. In general, the amount of cellulose ether used will be a water-thickening amount, i.e., at least an amount which will significantly thicken the water to which it is added. For example, amounts in the order of 25 to 100 parts per million weight (0.0025 to 0.01 weight percent) have been found to significantly thicken water. Water containing 25 ppm of CMC has a viscosity increase of about 21 percent. At 50 ppm the viscosity increase is about 45 percent. At 100 ppm the viscosity increase is about 195 percent. Generally speaking, amounts in the range of from 0.01 to 5, preferably from 0.1 to about 2, more preferably 0.1 to about 1.5, weight percent, based on the weight of water, can be used. However, amounts outside said ranges can be used. In general, with the proper amounts of polyvalent metal and reducing agent, the amount of cellulose ether used will determine the consistency of the gel obtained. Small amounts of cellulose ether will usually produce liquid mobile gels which can be readily pumped whereas large amounts of cellulose ether will usually produce more viscous gels. Gels having a viscosity "too thick to measure" by conventional methods can still be used in the practice of the invention. Thus, there is really no fixed upper limit on the amount of cellulose ether which can be used so long as the gelled acidic composition can be pumped in accordance with the methods of the invention.

Metal compounds which can be used in the practice of the invention are water-soluble compounds of polyvalent metals wherein the metal is present in a valence state which is capable of being reduced to a lower polyvalent valence state, and which will meet the above-stated compatibility requirements. Thus, under proper conditions of use, examples of such compounds can include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used will be a small but finite amount which is effective or sufficient to cause gelation of an aqueous dispersion of the starting components of the compositions of the invention when the metal in the polyvalent metal compound is reduced to a lower polyvalent valence state. The lower limit of the concentration of the starting metal-containing compound will depend upon several factors including the particular type of cellulose ether used, the concentration of the cellulose ether, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gelled compositions. It is believed this can provide one valuable method for controlling stability or life span so as to obtain gelled acidic compositions which will break down with time and/or temperature to permit ready well clean-up subsequent to an acidizing fracturing-acidizing operation. As a general guide, the amount of the starting polyvalent metal-containing compound used in preparing the gelled acidic compositions of the invention will be in the range of from 0.05 to 30, preferably 0.5 to 20, weight percent of the amount of the cellulose ether used. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by suitable experiments carried out in the light of this disclosure.

Suitable water-soluble reducing agents which can be used in the practice of the invention are those meeting the above-stated compatibility requirements. Under proper conditions of use this can include sulfur-containing compounds such as sodium sulfite, potassium sulfite, sodium hydrosulfite, potassium hydrosulfite, sodium metabisulfite, potassium metabisulfite, sodium bisulfite, potassium bisulfite, sodium sulfide, potassium sulfide, sodium thiosulfate, potassium thiosulfate, ferrous sulfate, hydrogen sulfide, and others; and nonsulfur-containing compounds such as hydroquinone, sodium iodide, potassium iodide, ferrous chloride, p-hydrazinobenzoic acid, hydrazine phosphite, hydrazine dichloride, and others. Some of the above reducing agents act more quickly than others.

One presently preferred group of reducing agents are the water-soluble organic compounds containing from 1 to about 10 carbon atoms per molecule and which release hydrogen sulfide upon hydrolysis. These compounds contain the group =C=S and include organic amides, xanthate salts, trithiocarbonate salts, and dithiocarbamate salts. Some examples are: thioacetamide, thiourea, thioformamide, thiopropionamide, sodium ethyl xanthate, N,N-diethyl sodium dithiocarbamate, sodium butyltrithiocarbonate, and the like. It is also within the scope of the invention to use mixtures of said reducing agents.

The amount of reducing agent to be used in preparing the gelled acidic compositions of the invention will be a small but finite amount which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent metal compound to said lower polyvalent valence state, e.g., $+6$ Cr to $+3$ Cr. In most instances it will be preferred to use at least a stoichiometric amount. However, in some instances, it may be desirable to use amounts of reducing agent outside said ranges. The use of such amounts is within the scope of the invention. Those skilled in the art can determine the amount of reducing agent to be used by suitable simple experiments carried out in the light of this disclosure.

Acids useful in the practice of the invention include any non-oxidizing acid meeting the above-stated compatibility requirements and which is effective in increasing the flow of fluids, e.g., hydrocarbons, through the formation and into the well. Thus, under proper conditions of use, examples of such acids can include inorganic acids such as hydrochloric acid and sulfuric acid; $C_1$–$C_3$ organic acids such as formic acid, acetic acid, propionic acid, and mixtures thereof; and combinations of inorganic and organic acids. The concentration or strength of the acid can vary depending upon the type of acid, the type of formation being treated, the above-stated compatibility requirements, and the results desired in the particular treating operation. The concentration can vary from 1 to about 60 weight percent, with concentrations within the range of 5 to 50 weight percent usually preferred, based upon the total weight of the gelled acidic composition. When an inorganic acid such as hydrochloric acid is used it is presently preferred to use an amount which is sufficient to provide an amount of HCl within the range of from 1 to 12, more preferably 1 to about 10, weight percent based on the total weight of the gelled acidic composition. The acids used in the practice of the invention can contain any of the known corrosion inhibitors, deemulsifying agents, sequestering agents, surfactants, friction reducers, etc., known in the art and which meet the above-stated compatibility requirements.

The gelled acidic compositions of the invention are aqueous compositions. They normally contain a significant amount of water. The amount of said water can vary widely depending upon the concentrations of the other components in the compositions, particularly the concentration of the acid. For example, when an organic acid such as acetic acid is used in the maximum concentration of 60 weight percent the amount of water present in the composition clearly will be less than when an inorganic acid such as HCl is used in the preferred maximum concentration of about 10 weight percent. Thus, while no precise overall range of water content can be set forth, based on the above-stated overall ranges for the concentrations of said other components the water content of said compositions can be in the range of from about 5 to about 99, frequently about 50 to about 95, weight percent. However, amounts of water outside said ranges can be used.

Propping agents can be included in the gelled acidic compositions of the invention if desired. Propping agents which can be used include any of those known in the art, e.g., sand grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed. When propping agents are used they should be made of materials which are not severely attacked by the acid used during the time they are exposed to said acid.

Any suitable method can be employed for preparing the gelled acidic compositions of the invention. Thus, any suitable mixing technique or order of addition of the components of said composition to each other can be employed which will provide a said composition having sufficient stability to degeneration by the heat of the formation (in which the composition is to be used) to permit good penetration of the composition into, and significant etching of, said formation. However, it is ordinarily preferred to first dissolve or disperse the cellulose ether in water before contacting the cellulose ether with acid. Thus, it is preferred to avoid contacting the dry cellulose ether with aqueous acid. Some suitable mixing orders, with the components named in order of mixing, include: water—celluose ether—polyvalent metal compound—reducing agent—acid; water—cellulose ether—acid—polyvalent metal compound—reducing agent; and water—cellulose ether—polyvalent metal compound—acid—reducing agent; and the like. It is within the scope of the invention to moisten or slurry the cellulose ether with a small amount, e.g., about 1 to about 6 weight percent based on the weight of said ether, of a low molecular weight alcohol, e.g., $C_1$–$C_3$ alcohols, as a dispersion aid prior to dispersing said ether in water. Contact of the polyvalent metal compound and reducing agent in the absence of the dispersed cellulose ether should be avoided. Since the acid may sometimes have a degrading effect on the cellulose ether, it is preferred that the acid not be in contact with the cellulose ether, even in aqueous solution, unduly long in the absence of the gelling agents. Similarly, it is preferred that there be no undue delay between completing the preparation of the gelled acidic composition and its introduction into contact with the formation.

The gelled acidic compositions of the invention can be prepared on the surface in a suitable tank equipped with suitable mixing means, and then pumped down the well and into the formation employing conventional equipment for pumping acidic compositions. However, it is within the scope of the invention to prepare said compositions while they are being pumped down the well. This technique is sometimes referred to as "on the fly." For example, a solution of the cellulose ether in water can be prepared in a tank adjacent the well head. Pumping of this solution through a conduit to the well head can then be started. Then, a few feet downstream from the tank a suitable connection can be provided for introducing the polyvalent metal compound into said conduit, either dry through a mixing hopper, or preferably as an aqueous solution. Then, a few feet farther downstream the reducing agent can be similarly introduced, preferably as an aqueous solution. The acid can then be introduced into said conduit a few feet downstream from the reducing agent. As will be understood by those skilled in the art, the rate of introduction of said components into said conduit will depend upon the pumping rate of the polymer solution through said conduit. Any of the above-mentioned orders of addition can be employed in said "on the fly" technique. Mixing orifices can be provided in said conduit, if desired.

It is within the scope of the invention to precede the injection of the gelled acidic composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease in the order of 100° to 250° F.

The following examples will serve to further illustrate the invention, but should not be considered as unduly limiting on the invention.

EXAMPLE I

An aqueous solution containing 5000 ppm of sodium carboxymethylcellulose (CMC9H) having a degree of substitution of about 0.9 was treated to contain 1000 ppm $Na_2Cr_2O_7.2H_2O$ and 800 ppm $NaHSO_3$. After stirring two minutes, the solution was diluted with an equal volume of 20 percent acetic acid to give a solution containing about 10 weight percent acid. Thirty minutes later sufficient gelation had taken place to result in an apparent viscosity (Model 35 Fann V-G Meter) of 400 cp at 10 sec$^{-1}$.

EXAMPLE II

In a manner similar to that of Example I, a 10,000 ppm aqueous solution of that same soluble cellulose ether was treated to contain 1500 ppm $Na_2Cr_2O_7.2H_2O$ and 7500 ppm potassium iodide. After stirring two minutes, the solution was diluted with an equal volume of 98 percent acetic acid to give a solution containing about 49 weight percent acetic acid. After 25 to 30 minutes sufficient gelation had taken place to result in an apparent viscosity (Model 35 Fann V-G Meter) of 750 cp at 10 sec$^{-1}$.

EXAMPLE III

The gelled acidic compositions of Examples I and II were tested for reactivity with carbonate rock by immersing a core sample of carbonate rock into each of the thickened solutions. The reactivity of the gelled compositions with the rock samples was significantly slower than that observed with a similar piece of the same carbonate rock immersed in a 10 percent solution of non-gelled acetic acid.

EXAMPLE IV

Several acid gelation runs were carried out to show the effects of order of mixing and type of reducing agent. In each of these runs, except as noted, 7.5 g of sodium carboxymethyl cellulose (CMC9H) was slurried with 5 ml isopropanol and then dissolved in 375 ml tap water. A 0.625 g (1250 ppm) quantity of $Na_2Cr_2O_7.2H_2O$ was then dissolved in the solution followed by the addition of the indicated quantity of reducing agent. The solution was then stirred for 30 seconds and then 125 ml of 37.5 weight percent HCl solution was added. In one run, the acid was added after the dichromate but before the reducing agent. After one hour at room temperature, the apparent viscosity of the gelled acid solution was measured employing a Model 35 Fann V-G Meter. The results of these tests are shown in the table below:

| | Run No. | | | |
|---|---|---|---|---|
| | A | B | C | D |
| Red. Agent, g | 1.5 $CH_3CSNH_2$ | 2.0 KI | None | 2.0 $NaHSO_3$ |
| Order of Acid addition | last | last | last | before Red. agent |
| Fann viscosity, cp | | | | |
| at 5 sec$^{-1}$ | 3200 | 14000 | 500 | 2000 |
| at 10 sec$^{-1}$ | 5300 | 9000 | 350 | 1100 |
| at 170 sec$^{-1}$ | 756 | off scale | 117 | 222 |
| at 340 sec$^{-1}$ | off scale | off scale | 85 | 154 |
| at 510 sec$^{-1}$ | off scale | off scale | 68 | 120 |
| at 1020 sec$^{-1}$ | off scale | off scale | 47 | 80 |

Based on the data in the above table it is concluded that hydrochloric acid solutions of about 10 weight percent concentration can be gelled by the process of the present invention, e.g., Runs A, B, and D. Three different reducing agents were used. Control Run C shows markedly inferior thickening, e.g., no gelation. The data also show that different orders of mixing and various types of reducing agents can be used in the practice of the invention.

EXAMPLE V

In this series of runs a still different, though presently less preferred, order of mixing was used to prepare gels of acetic acid with sodium carboxymethyl cellulose (CMC9H). Gelled solutions containing about 2 weight percent of said soluble cellulose ether polymer and ranging from about 15 to about 50 weight percent acetic acid were made, heated to 250° F., cooled, and then tested for viscosity.

The procedure in each run was as follows. A weighed amount of the soluble cellulose ether was dispersed in a measured quantity of tap water (Solution 1). Separately, another weighed amount of the cellulose ether was dispersed in a measured amount of glacial acetic acid (Solution 2). While stirring Solution 1, Solution 2 was added thereto and blended for 2–3 minutes. A weighed amount of $Na_2Cr_2O_7.2H_2O$ was then added, followed by a weighed amount of thiourea, followed by stirring until uniform, to obtain a gelled fluid for viscosity measurements.

Each of the above-prepared fluids was placed in a sealed container and the container then pressured to 100 psi with nitrogen. The containers were then heated to 250° F. (121° C.), and maintained at that temperature for one hour. The containers were then cooled to 80° F., the gelled solutions removed therefrom, and the apparent viscosities of said gelled solutions were measured at room temperature using a Fann Model 35 viscometer. The results of these runs (Runs 1–15) are set forth in Table I below.

In another series of similar runs, the gelled acid fluids were prepared in the same fashion except that the order of mixing was again varied. In these runs the dichromate and the thiourea were added to solution 1 before Solution 2 (containing the acid) was added to Solution 1. These gelld fluids were also heated to 250° F. as before and tested for viscosity. The results of these runs (Runs 16–27) are also known in Table I.

another series. The effect of different mixing techniques was investigated.

In Method I, the polymer was dispersed in the aqueous acid (either 10 weight percent HCl or 50 weight percent acetic acid), then blended with an appropriate amount of $Na_2Cr_2O_7.2H_2O$ followed by an appropriate amount of $NaHSO_3$.

In Method II, the polymer was dissolved in water, then the $Na_2Cr_2O_7.2H_2O$ was added, and the $NaHSO_3$ was added. After about 10 minutes the appropriate amount of acid (either 37.5 weight percent HCl or 99.7 weight percent acetic acid) was added to give the desired final acid concentration.

In Method III, the polymer was dissolved in water, then the appropriate amount of acid (either 37.5 weight percent HCl or 99.7 weight percent acetic acid) was added. Immediately afterwards, the dichromate was dissolved into the mixture followed by the bisulfite component.

In Method IV, the polymer was dissolved in the

Table I

| | Gelled Acetic Acid-Containing Compositions | | | | | | |
|---|---|---|---|---|---|---|---|
| Run | Solution 1 | | Solution 2 | | Dichromate | Thiourea | Viscosity, cp | |
| No. | Polymer, g | Water, ml | Polymer, g | HAc, ml | g | g | at 511 sec$^{-1}$ | Remarks |
| 1 | 6.3 | 424 | 3.7 | 78 | 2.0 | 2.0 | TTM$^a$ | hard gel, 15% HAc |
| 2 | 6.3 | 424 | 3.7 | 78 | 2.0 | 4.0 | TTTM | hard gel, 15% HAc |
| 3 | 6.3 | 424 | 3.7 | 78 | 2.0 | 6.0 | TTTM | hard gel, 15% HAc |
| 4 | 5.9 | 398 | 4.1 | 103 | 2.0 | 2.0 | TTTM | soft gel, 20% HAc |
| 5 | 5.9 | 398 | 4.1 | 103 | 2.0 | 4.0 | TTTM | soft gel, 20% HAc |
| 6 | 5.9 | 398 | 4.1 | 103 | 2.0 | 6.0 | TTTM | soft gel, 20% HAc |
| 7 | 5.5 | 372 | 4.5 | 132 | 2.2 | 2.2 | TTTM | gelled fluid, 25% HAc |
| 8 | 5.5 | 372 | 4.5 | 132 | 2.2 | 4.4 | TTTM | gelled fluid, 25% HAc |
| 9 | 5.5 | 372 | 4.5 | 132 | 2.2 | 6.6 | TTTM | gelled fluid, 25% HAc |
| 10 | 4.9 | 318 | 5.1 | 183 | 1.9 | 1.9 | 145 | gelled fluid, 35% HAc |
| 11 | 4.9 | 318 | 5.1 | 183 | 1.9 | 3.9 | 200 | gelled fluid, 35% HAc |
| 12 | 4.9 | 318 | 5.1 | 183 | 1.9 | 5.7 | 150 | gelled fluid, 35% HAc |
| 13 | 3.5 | 236 | 6.5 | 262 | 1.4 | 1.4 | 28 | gelled fluid, 50% HAc |
| 14 | 3.5 | 236 | 6.5 | 262 | 1.4 | 2.8 | 31 | gelled fluid, 50% HAc |
| 15$_b$ | 3.5 | 236 | 6.5 | 262 | 1.4 | 5.2 | 50 | gelled fluid, 50% HAc |
| 16$_b$ | 6.3 | 424 | 3.7 | 78 | 2.5 | 2.5 | 90 | gelled fluid, 15% HAc |
| 17$_b$ | 6.3 | 424 | 3.7 | 78 | 2.5 | 5.0 | 40 | gelled fluid, 15% HAc |
| 18$_b$ | 6.3 | 424 | 3.7 | 78 | 2.5 | 7.5 | 100 | gelled fluid, 15% HAc |
| 19$_b$ | 5.9 | 398 | 4.1 | 103 | 2.3 | 2.3 | 23 | broken gel, 20% HAc |
| 20$_b$ | 5.9 | 398 | 4.1 | 103 | 2.3 | 4.6 | 48 | gelled fluid, 20% HAc |
| 21$_b$ | 5.9 | 398 | 4.1 | 103 | 2.3 | 6.9 | 300+ | gelled fluid, 20% HAc |
| 22$_b$ | 5.5 | 372 | 4.5 | 132 | 2.2 | 2.2 | 25 | broken gel, 25% HAc |
| 23$_b$ | 5.5 | 372 | 4.5 | 132 | 2.2 | 4.4 | 18 | broken gel, 25% HAc |
| 24$_b$ | 5.5 | 372 | 4.5 | 132 | 2.2 | 6.6 | 78 | gelled fluid, 25% HAc |
| 25$_b$ | 4.9 | 318 | 5.1 | 183 | 1.9 | 1.9 | 62 | gelled fluid, 35% HAc |
| 26$_b$ | 4.9 | 318 | 5.1 | 183 | 1.9 | 3.9 | 13 | broken gel, 35% HAc |
| 27$_b$ | 4.9 | 318 | 5.1 | 183 | 1.9 | 5.8 | 35 | broken gel, 35% HAc |

Notes:
$^a$TTTM is too thick to measure with Fann viscometer, but considered a good gel.
$^b$In these runs, Solution 1 is mixed with dichromate and thiourea before being mixed with Solution 2. In all other runs, Solution 1 is mixed with Solution 2, then the dichromate and thiourea are added.

From the data in the above Table I it is concluded that acetic acid can be gelled at concentrations ranging from 15 to about 50 weight percent using CMC, sodium dichromate, and thiourea. The gelled fluids, particularly those having above 25 weight percent acid concentration lose a substantial portion of their viscosity after heating 1 hour at 250° F. (121° C.). Some gels are broken. It is also concluded that it is preferred to add the gelling agents (dichromate and reducing agent) to the solution of CMC after the acid as in Runs 1–15.

EXAMPLE VI

In still another group of runs, sodium carboxymethyl cellulose (CMC9H) was used to prepare gelled acidic compositions containing about 10 weight percent HCl in one series, and about 50 weight percent acetic acid in water by means of a high speed, high shear mixer (Hamilton Beach malt mixer). Then, in rapid succession, the dichromate was added, the appropriate amount of concentrated acid was added, and the bisulfite was added. The total mixing time was about 2 minutes.

Each of the compositions prepared by the above-described methods was visually examined for the appearance of gelation and then further examined (when appropriate) for viscosity level, after 1 hour at room temperature, using a Fann Model 35 V-G meter which had been modified to resist acid corrosion.

For purposes of comparison several additional runs were carried out which were identical to those described above except that the dichromate and bisulfite components were omitted. These runs, as well as the invention runs, are shown in Table II.

Table II

| | | | | | Gelled Acidic Compositions | | | | | | |
|---|---|---|---|---|---|---|---|---|---|---|---|
| | | | | Gelling Agents | | | | | | | |
| Run No. | Mixing Method | CMC g | Water ml | Acid ml | DiCr ppm | NaHSO$_3$ ppm | Fann Apparent Viscosities after 1 hour at R.T., cp | | | | | |
| | | | | | | | 5 sec$^{-1}$ | 10 sec$^{-1}$ | 170 sec$^{-1}$ | 340 sec$^{-1}$ | 510 sec$^{-1}$ | 1020 sec$^{-1}$ |
| 1 | (c) | 7.5 | 375 | 125$^a$ | 0 | 0 | (c) | — | — | — | — | — |
| 2 | (d) | 7.5 | 375 | 125$^a$ | 0 | 0 | 500 | 350 | 117 | 85 | 68 | 47 |
| 3 | I | 7.5 | 375 | 125$^a$ | 1250 | 4000 | (e) | — | — | — | — | — |
| 4 | II | 7.5 | 375 | 125$^a$ | 1250 | 1250 | 1600 | 1200 | 252 | 142 | 110 | 75 |
| 5 | III | 7.5 | 375 | 125$^a$ | 1250 | 4000 | 5200 | 3200 | 666 | 402 | 300 | off scale |
| 6 | IV | 7.5 | 375 | 125$^a$ | 1250 | 4000 | 2000 | 1100 | 222 | 154 | 120 | 80 |
| 7 | (f) | 7.5 | 250 | 250$^b$ | 0 | 0 | (f) | — | — | — | — | — |
| 8 | (d) | 7.5 | 250 | 250$^b$ | 0 | 0 | 1500 | 1200 | 315 | 205 | 158 | 108 |
| 9 | I | 7.5 | 250 | 250$^b$ 1250 | 4000 | | (e) | — | — | — | — | — |
| 10 | II | 3.75 | 250 | 250$^b$ | 1250 | 4000 | TTTM$^g$ | — | — | — | — | — |
| 11 | III | 3.75 | 250 | 250$^b$ | 1250 | 4000 | TTTM$^g$ | — | — | — | — | — |
| 12 | IV | 7.5 | 250 | 250$^b$ | 1250 | 4000 | TTTM$^g$ | — | — | — | — | — |

Notes:
a. 37.5 weight percent HCl. Final acid concentration about 10 weight percent.
b. 99.7 weight percent acetic acid. Final acid concentration about 50 weight percent.
c. Comparison run. No gelling agents used. Polymer was dispersed in 10% HCl but precipitation occurred and no viscosity measurement was made.
d. Comparison run. No gelling agents used. Polymer was dissolved in water, then acid was added.
e. Precipitation occurred before crosslinking agents could be added. No viscosity measurements made.
f. Comparison run. No gelling agents used. Polymer was dispersed in 50% acetic acid but precipitation occurred and no viscosity measurements were made.
g. Too thick to measure. Gelled acid was semi-solid.

Based on the data in Table II it is concluded that the order of mixing is important. Said data illustrate that contact of unhydrated soluble cellulose polymer with acid should be minimized or avoided completely. Thus, it is concluded the acid should preferably be incorporated into the mixture only after the polymer is dissolved in water, and either before or after the gelling components have been added. Based on Run 5 it is concluded that the more preferred procedure is to incorporate the acid before adding the gelling components, at least when the acid is HCl.

From comparing the visocisities of the compositions of the invention runs with those of the comparison runs it is concluded that the gelling components are desirable and advantageous for obtaining greater increases in viscosity. The semi-gold gelled acidic compositions which were too thick to be measured in the Fann instrument are considered to have suitable viscosity for fracturing operations.

EXAMPLE VII

A 15 g quantity of sodium carboxymethyl cellulose (CMC9H) was blended into 500 ml of tap water with the aid of a high speed mixer (Hamilton Beach malt mixer) for one minute. After standing at room temperature for 2 days, a 150 ml portion of this about 3 weight percent polymer solution was transferred to a pint jar. To this was added 3.75 ml of sodium dichromate dihydrate stock solution (about 100,000 ppm) with stirring followed by 150 ml glacial acetic acid. About 1 minute later, 0.45 g thioacetamide was added and the mixture was blended to a homogeneous gel in a Hamilton Beach malt mixer.

Since this gelled composition (about 50 weight percent acetic acid, about 1.5 weight percent polymer, about 1250 ppm Na$_2$Cr$_2$O$_7$.2H$_2$O and about 1500 ppm thioacetamide) was too thick to transfer to a capillary viscometer, the gel was transferred to a test tube and the test tube was placed in a water bath at 93° F. The temperature of the bath was then increased at a rate sufficient to reach 200° F. in about 1 hour. After one hour of heating, an attempt was made to pour the gel into a capillary viscometer. However, the gel remained too thick for viscosity measurements, e.g., by measuring efflux times in the viscometer.

For purposes of comparison, another composition was prepared and tested similarly except that the dichromate and thioacetamide gelling agents were omitted. This composition could be transferred to the capillary viscometer maintained in a water bath. The temperature of the water bath was increased from about 82° to 200° F. over a period of about 1 hour. Efflux times were measured as shown in the table below. The essential conditions and results of tests on both compositions are shown in Table III below.

TABLE III

| | Run 1 | | Run 2 | |
|---|---|---|---|---|
| | Gelling Agents Present | | No Gelling Agents Present | |
| Time in Bath (min) | Bath Temp. (°F.) | Efflux Time. (sec.) | Bath Temp. (°F.) | Efflux Time (sec.) |
| 0 | 93 | ** | 82 | * |
| 5 | NR$^a$ | ** | 103 | * |
| 10 | 128 | ** | 115 | * |
| 15 | 139 | ** | 132 | * |
| 20 | 154 | ** | 145 | * |
| 25 | NR$^a$ | ** | 156 | * |
| 30 | 174$^b$ | ** | 168 | * |
| 35 | NR$^a$ | ** | 176 | * |
| 40 | 183 | ** | 186 | 138 |
| 45 | 189 | ** | 192 | 90 |
| 50 | 193 | ** | 194 | 69 |
| 55 | NR$^a$ | ** | 198 | 42 |
| 60 | 201 | ** | 201 | 26 |

$^a$NR represents "Not Recorded".
$^b$This bath temperature was taken at 32 minutes.
*Too thick, no efflux time could be determined.
**Composition was too thick to transfer to the capillary viscometer; this sample was contained in a test tube while heating in the water bath.

Based on the data in Table III, it is concluded that the gelled acidic composition of Run 1 containing the dichromate and thioacetamide gelling agents was more thermally stable than the composition of Run 2 which did not contain any gelling agents. This is shown by the thinning of the composition of Run 2 due to decreasing stability as manifested by the decreasing efflux times over the temperature range of 186° F. to 201° F.

EXAMPLE VIII

Gelled acidic compositions containing 5 and 10 weight percent HCl were prepared using a water-soluble cellulose ether polymer, sodium dichromate, and sodium bisulfite. The polymer was the sodium salt of carboxymethyl cellulose (CMC9H) in which the degree of substitution was about 0.9.

The compositions were prepared by a rapid mixing technique in which the following components were added to water which was being rapidly agitated in a high speed mixer (Hamilton Beach Malt Mixer): (1) the soluble polymer, followed by a few seconds of mixing; (2) adding the $Na_2Cr_2O_7.2H_2O$ component; (3) then adding the appropriate amount of 37 wt. % HCl; and finally (4) the $NaHSO_3$ component. The total mixing time was about one minute or less. For purposes of comparison, other compositions were similarly prepared except that no dichromate or bisulfite was used. Viscosities of the compositions were determined on a Model 35 Fann viscometer. Component concentrations and viscosity results are shown in Table IV below.

TABLE IV

| Composition of Fluid | | | | Viscosity (Fann) of Fluid, cp | | |
|---|---|---|---|---|---|---|
| CMC ppm | $Na_2CR_2O_7$·$2H_2O$ ppm | HCl wt % | $NaHSO_3$ ppm | 100 $sec^{-1}$ | 500 $sec^{-1}$ | 1000 $sec^{-1}$ |
| 15,000 | 0 | 10 | 0 | $450^b$ | $155^b$ | $103^b$ |
| 15,000 | 1250 | 10 | 4000 | $680^b$ | $220^b$ | $140^b$ |
| 10,000 | 0 | 5 | 0 | $255^a$ | $90^a$ | $58^a$ |
| 10,000 | 1250 | 5 | 2000 | $425^a$ | $132^a$ | $80^a$ |

$^a$Viscosity of 5% HCl compositions measured 1.75 hours after mixing.
$^b$Viscosity of 10% HCl compositions measured 1 hour after mixing.

Based on the data shown in Table IV above, it is concluded that gelled acidic compositions in accordance with the invention can be prepared by short high speed mixing methods such as the "on the fly" method described elsewhere herein. The viscosities of the gelled acidic compositions prepared with the dichromate and the bisulfite were greater than the viscosities of the compositions prepared without these gelling agents.

Based on the data in the above Examples, it is concluded that the gelled acidic compositions comprising a solution of a water-soluble cellulose ether having incorporated therein sodium dichromate dihydrate, a suitable reducing agent, and a suitable acid, in suitable amounts in accordance with the above-stated compatibility requirements are suitable for use in accordance with the invention. From the viscosity data given in said Examples it is concluded that because of their greater viscosity the gelled acidic compositions of the invention would be superior to comparable ungelled compositions, particularly in fracture-acidizing operations. From said viscosity data, and the stability data of Examples V and VIII, it is further concluded that the components of the gelled acidic compositions of the invention have sufficient compatibility with each other to permit good penetration (as defined above) into the formation, and permit maintaining of the composition in contact with the formation for a period of time usually sufficient for the acid to significantly react with the acid-soluble components of the formation. Thus, it is further concluded that suitable compositions in accordance with the invention could be used advantageously for acidizing operations in wells having a depth of up to at least 10,000 feet, and at formation temperatures of up to at least 200° F. The use of a preflush cooling fluid injected down the well and into the formation prior to the injection of the gelled acidic composition would extend said ranges of operation. As will be understood by those skilled in the art, the actual attainable ranges of effective acidizing operation will depend upon the viscosity of the gelled composition, the formation temperature, the composition of the formation, the rate of injection of the gelled acidic composition, the acid concentration in said gelled acidic composition, etc.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A gelled acidic composition, suitable for matrix-acidizing or fracture-acidizing of a subterranean formation, comprising:

water;

a water-thickening amount of a water-soluble cellulose ether;

an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state, said compound being selected from the group consisting of potassium permanganate, sodium permanganate, ammonium chromate, ammonium dichromate, the alkali metal chromates, the alkali metal dichromates and chromium trioxide;

an amount of a water-soluble reducing agent which is effective to reduce at least a portion of said metal to said lower valence state and cause said gelation; and an amount within the range of from 1 to 12 weight percent, based on the total weight of the composition of a non-oxidizing acid which is capable of reacting with a significant amount of the acid-soluble components of said formation, said non-oxidizing acid being selected from the group consisting of hydrochloric acid, sulfuric acid and mixtures thereof;

said cellulose ether, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to significantly react with the acid-soluble components of said formation and stimulate the production of hydrocarbons therefrom.

2. A composition according to claim 1 wherein:

the amount of said cellulose ether is within the range of from 0.01 to about 5 weight percent based upon the total weight of said composition;

the amount of said polyvalent metal compound is within the range of from 0.05 to 30 weight percent based upon the weight of said cellulose ether; and the amount of said reducing agent is within the range of from 0.1 to about 200 percent of the stoichiometric amount required to reduce said polyvalent metal to said lower valence state.

3. A composition according to claim 1 wherein said cellulose ether is a carboxymethyl cellulose.

4. A composition according to claim 2 wherein:
said cellulose ether is a carboxymethyl cellulose.

5. A composition according to claim 4 wherein:
said cellulose ether is sodium carboxymethyl cellulose and the amount thereof is within the range of from about 0.1 to about 1.5 weight percent;
said polyvalent metal compound is sodium dichromate or potassium dichromate;
said acid is aqueous hydrochloric acid and the amount thereof is sufficient to provide an amount of HCl within the range of from about 1 to about 10 weight percent, based on the total weight of said composition; and
said reducing agent is selected from the group consisting of sodium or potassium bisulfite, sodium or potassium iodide, thiourea, and thioacetamide.

6. A method for preparing a gelled acidic composition, suitable for matrix-acidizing or fracture-acidizing of a subterranean formation, which method comprises:
dispersing a water-thickening amount of a water-soluble cellulose ether in water;
adding to said water containing said cellulose ether an amount within the range of from 1 to 12 weight percent, based on the total weight of the composition of a non-oxidizing acid which is capable of reacting with a significant amount of the acid-soluble components of said formation, said non-oxidizing acid being selected from the group consisting of hydrochloric acid, sulfuric acid, and mixtures thereof;
then adding to said water an amount of a water-soluble compound of a polyvalent metal wherein the metal present is capable of being reduced to a lower polyvalent valence state and which is sufficient to cause gelation of an aqueous dispersion of the compounds of said composition when the valence of at least a portion of said metal is reduced to said lower valence state, said compound being selected from the group consisting of potassium permanganate, sodium permanganate, ammonium chromate, ammonium dichromate, the alkali metal chromates, the alkali metal dichromates and chromium trioxide; and
then adding to said water an amount of a water-soluble reducing agent which is effective to reduce at least a portion of said metal to said lower valence state and cause said gelation;
said cellulose ether, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to significantly react with the acid-soluble components of said formation and stimulate the production of hydrocarbons therefrom.

7. A method according to claim 6 wherein:
the amount of said cellulose ether is within the range of from 0.01 to about 5 weight percent based upon the total weight of said composition;
the amount of said polyvalent metal compound is within the range of from 0.05 to 30 weight percent based upon the weight of said cellulose ether; and
the amount of said reducing agent is within the range of from 0.1 to about 200 percent of the stoichiometric amount required to reduce said polyvalent metal to said lower valence state.

8. A method according to claim 7 wherein:
said cellulose ether is a carboxymethyl cellulose.

9. A method according to claim 8 wherein:
said cellulose ether is sodium carboxymethyl cellulose and the amount thereof is within the range of from about 0.1 to about 1.5 weight percent;
said polyvalent metal compound is sodium dichromate or potassium dichromate;
said acid is aqueous hydrochloric acid and the amount thereof is sufficient to provide an amount of HCl within the range of from about 1 to about 10 weight percent, based on the total weight of said composition; and
said reducing agent is selected from the group consisting of sodium or potassium bisulfite, sodium or potassium iodide, thiourea, and thioacetamide.

* * * * *